United States Patent
Hu et al.

(10) Patent No.: US 11,526,154 B2
(45) Date of Patent: Dec. 13, 2022

(54) COMMISSIONING AND CONDITION MONITORING OF INDUSTRIAL PROCESSES USING A WIRELESS SENSING DEVICE

(71) Applicant: ABB Schweiz AG, Baden (CH)

(72) Inventors: Zhongliang Hu, Helsinki (FI); Mikko Kohvakka, Helsinki (FI); Teemu Tanila, Helsinki (FI)

(73) Assignee: ABB Schweiz AG, Baden (CH)

( * ) Notice: Subject to any disclaimer, the term of this patent is extended or adjusted under 35 U.S.C. 154(b) by 239 days.

(21) Appl. No.: 16/885,960

(22) Filed: May 28, 2020

(65) Prior Publication Data

US 2020/0379444 A1    Dec. 3, 2020

(30) Foreign Application Priority Data

May 28, 2019   (EP) ..................................... 19176997

(51) Int. Cl.
*G05B 19/418*   (2006.01)
(52) U.S. Cl.
CPC ..... *G05B 19/4183* (2013.01); *G05B 19/4185* (2013.01); *G05B 2219/15117* (2013.01);
(Continued)
(58) Field of Classification Search
CPC ............ G05B 19/4183; G05B 19/4185; G05B 2219/15117; G05B 2219/33192; G05B 2219/33116
(Continued)

(56) References Cited

U.S. PATENT DOCUMENTS

2010/0290351 A1   11/2010   Toepke et al.
2011/0133458 A1*   6/2011   Harrison .............. G05B 13/024
                                                                73/660
(Continued)

FOREIGN PATENT DOCUMENTS

| EP | 1589391 A2 | 10/2005 |
|----|------------|---------|
| EP | 3361424 A1 | 8/2018  |
| EP | 3388905 A1 | 10/2018 |

OTHER PUBLICATIONS

European Patent Office, Office Action in European Patent Application No. 19176997.5, 5 pp. (dated Jan. 20, 2022).

(Continued)

*Primary Examiner* — Hien D Khuu
(74) *Attorney, Agent, or Firm* — Leydig, Voit & Mayer, Ltd.

(57) ABSTRACT

According to an aspect, there is provided method for analyzing movement. Initially, information on one or more desired movement properties for a moving element of a mechanical system powered by an electrical machine which is controlled by a drive is maintained in a memory of a wireless sensing device. The wireless sensing device including one or more sensors is detachably fixed to the moving element of the mechanical system. The one or more sensors include one or more kinematic sensors. The wireless sensing device acquire results of a plurality of measurements performed by the wireless sensing device while the moving element is in motion. During the acquiring, the wireless sensing device compares results of the plurality of measurements with the one or more desired movement properties and communicates with the drive to adjust one or more drive parameters based on the comparing.

27 Claims, 7 Drawing Sheets

---

201: Maintain information on one or more desired movement properties in memory

202: Acquire results of plurality of measurements using one or more sensors while moving element is in motion 203: During acquiring, compare results of plurality of measurements with one or more desired movement properties and communicate with drive to adjust one or more drive parameters based on comparing

(52) U.S. Cl.
CPC ............... *G05B 2219/33116* (2013.01); *G05B 2219/33192* (2013.01)

(58) Field of Classification Search
USPC ........................................................... 700/1
See application file for complete search history.

(56) References Cited

U.S. PATENT DOCUMENTS

2015/0246442 A1  9/2015  Cho et al.
2018/0024534 A1  1/2018  Russell, III et al.

OTHER PUBLICATIONS

European Patent Office, Extended Search Report issued in corresponding Application No. 19176997.5, dated Nov. 20, 2019, 8 pp.

* cited by examiner

COMMISSIONING AND CONDITION MONITORING OF INDUSTRIAL PROCESSES USING A WIRELESS SENSING DEVICE

TECHNICAL FIELD

Various example embodiments relate to control of industrial processes.

BACKGROUND

Drives are used to control the motion of machines, typically to achieve optimal performance and efficiency from the given machine or machines. Drives are employed in many applications that require precise motion control, for example, in line automation applications employing lifts, cranes and/or conveyor belts. To ensure high user experience and quality of production, it is important to perform commissioning effectively and expediently so as to achieve desired operation for the controlled machine (e.g., in terms of speed, torque, acceleration, ramp settings and so on). Commissioning of a drive requires a lot of expertise and testing as the optimal drive parameters of the drive depend on the controlled machine and the industrial process in which it is used as well as on certain properties of the used drive, for example, motor type. Even if the commissioning is carried out perfectly, some further fine-tuning is often needed over the lifetime of the machine in order to compensate for the wear and tear of mechanical parts such as bearings and the gearbox. Conventionally, commissioning and possible further adjustments are made manually by adjusting drive parameters of the drive controlling the machine. Further, periodic condition monitoring is often required to prevent unexpected failures. Drives may be able to predict the lifetime of the drive itself with some accuracy by different counters and algorithms, but the condition of the rest of the system (e.g., the motor or the gearbox) is very difficult to monitor.

Therefore, there is a need for a better way for deploying and monitoring industrial processes controlled by a drive so as to overcome or alleviate at least some of the aforementioned problems.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide a method, an apparatus, a system and computer readable media for commissioning and/or condition monitoring of industrial processes.

BRIEF DESCRIPTION OF DRAWINGS

In the following, example embodiments will be described in greater detail with reference to the attached drawings, in which FIG. 1 illustrate an exemplary industrial system according to embodiments.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, Bluetooth Low Energy, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. The (wireless) communications network to be discussed below may, in some embodiments, be any wireless communications network listed in this paragraph.

Figure 1:
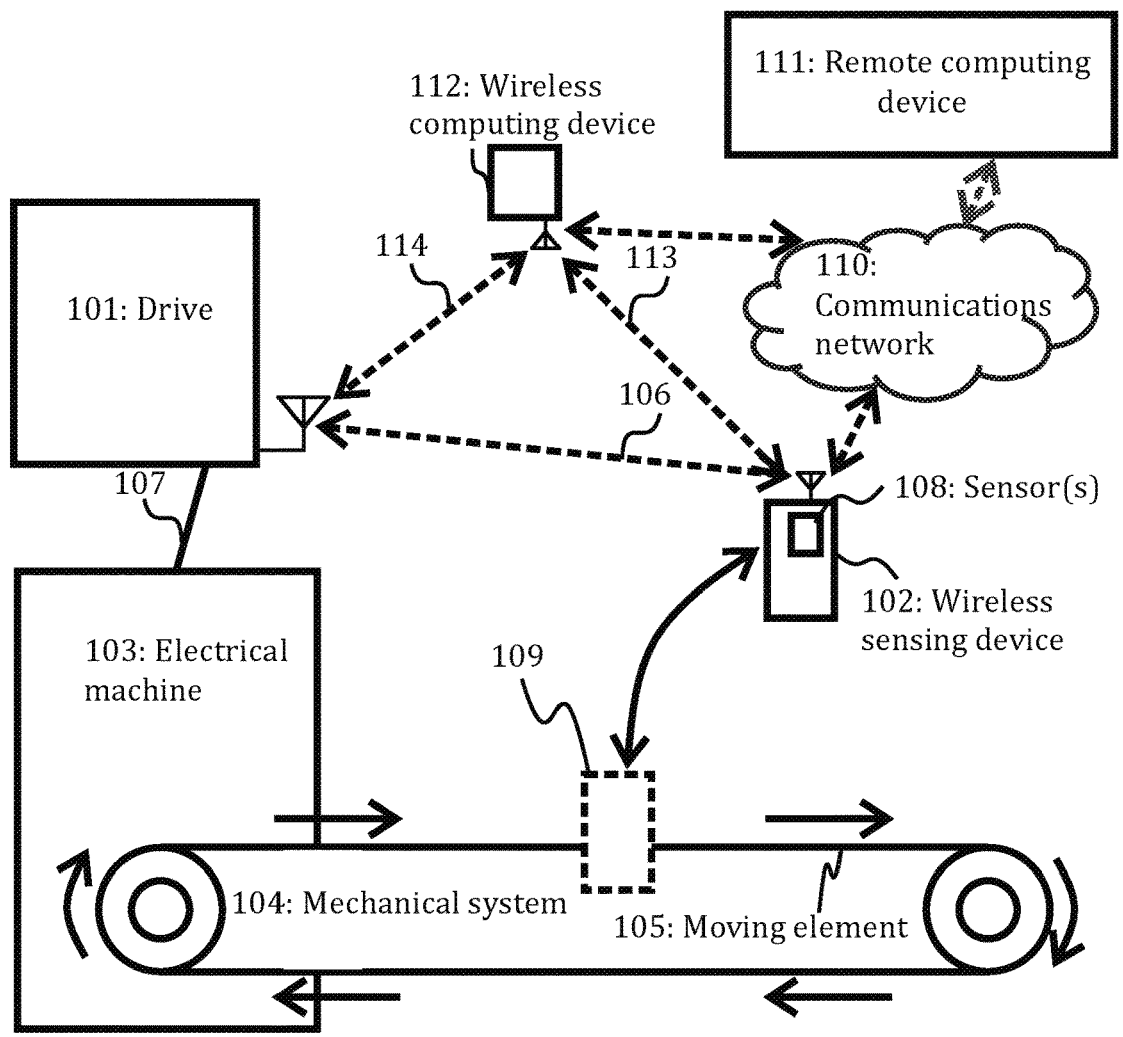

A general architecture of a system to which embodiments of the invention may be applied is illustrated in FIG. 1. FIG. 1 illustrates a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures.

FIG. 1 illustrates a system comprising a wireless sensing device 102, a drive 101, an electrical machine 103 controlled by the drive 101 and a mechanical system 104 connected to the electrical machine 103. The drive 101, the electrical machine 103 and the mechanical system 104 form together an industrial system (e.g., a production or assembly line system or a part thereof). The wireless sensing device 102 is able to communicate wirelessly with the drive 101 using a wireless communication link 106.

The drive 101 may be any device which may be used to control the motion of machines (for example, the rotation speed of an electrical motor of an electrical machine) by changing one or more drive parameters and which may be connected to the wireless sensing device 102 using the wireless communication link 106. The drive parameters of the drive 101 may comprise parameters such as torque (or torque reference), speed (or speed reference), power, voltage, frequency, motor control mode (e.g., scalar, vector or direct torque control), proportional-integral-derivative (PID)

controller settings, acceleration ramp settings, deceleration ramp settings, motor name plate values and/or other parameters affecting the operation of the drive. Regarding the torque and/or speed reference provided in the drive parameters, the drive may be configured so that the drive (or specifically the control loop of the drive) attempts to meet the speed or torque reference as well as possible (i.e., to make the actual speed match the speed reference and/or the actual torque match the torque reference). In the following, it is assumed that the drive 101 is an electrical drive (a DC drive or an AC drive supporting low to high voltages), though the embodiments of the invention may also be applied to hydraulic drives and/or mechanical drives. The drive 101 may be a frequency converter, a programmable logic controller (PLC) or a (motor) soft starter. In an embodiment, the drive 101 may be a variable speed drive (VSD) or a variable frequency drive (VFD).

The drive 101 may be connected using a (wired) connection 107 to an electrical machine 103 driving industrial or non-industrial processes (i.e., driving a machine, a device, a component, an apparatus or a system for performing an industrial or non-industrial process). The electrical machine 103 may comprise one or more AC and/or DC electrical motors which may run, for example, a system for transporting material, such as a pump, a fan, a compressor, a blower, a conveyor belt, a roller conveyor, a crane and/or an elevator and/or a system for processing materials, such as a paper machine, a mill, a stirrer and/or a centrifuge. In general, it is assumed that the electrical machine 103 is powering a mechanical system having at least one moving element 105, that is, at least one part or element 105 which is in motion during the operation of the mechanical system 104. In the illustrated non-limiting example, the mechanical system 104 is a belt conveyor system and said moving element 105 is a conveyor belt.

The wireless sensing device 102 refers to a computing device (equipment, apparatus) comprising one or more sensors 108 (preferably, a plurality of sensors) and being configured to communicate wirelessly with the drive 101 over the wireless communication link 106. The wireless sensing device may be a dedicated wireless sensor device (i.e., a device primarily intended for sensing potentially having relatively limited memory and/or processing power) or a multi-purpose wireless computing device, which comprises one or more sensors, such as a smart phone. The wireless sensing device 102 may be a portable device. The connection between the drive 101 and the wireless sensing device 102 may be provided via a wireless communication link 106 using any standard wireless protocol, such as Bluetooth or Wi-Fi. Said one or more sensors 108 may comprise one or more kinematic sensors (i.e., sensors sensing quantities associated with motion). The one or more kinematic sensors may comprise one or more sensors of the following types: a speed sensor, an acceleration sensor (i.e., an accelerometer), a vibration sensor, a position sensor, an angular position sensor, a displacement sensor, an angular velocity sensor (i.e., a gyro sensor), an angular acceleration sensor and a torque sensor. In some embodiments, the one or more kinematic sensors 108 may comprise two or more sensors of the same type. In some embodiments, the one or more sensors 108 may also comprise an acoustic sensor, a humidity sensor and/or a temperature sensor. The acoustic sensor measures an acoustic frequency spectrum which may be used for analyzing condition of one or more components of the mechanical system 104. The humidity and temperature sensors may be used to analyze the operating conditions of the industrial system which may affect the behavior of the industrial system used. Specifically, the temperature sensor may measure temperature rise during the operation of the system. Both of the temperature and the humidity sensor may be used to validate that the operation environment fulfills pre-defined requirements. Each of the one or more sensors 108 of the wireless sensing device may be a built-in sensor of the wireless sensing device 102 or an add-on to the wireless sensing device 102.

In some preferred embodiments, the wireless sensing device 102 may be a mobile phone (e.g., a smart phone) or a tablet computer. In such embodiments, the one or more (kinematic) sensors 108 may be built-in sensors of the mobile phone or the tablet computer. In general, computing devices (apparatuses) which may be employed include wireless mobile communication devices operating with or without a subscriber identification module (SIM) in hardware or in software, including, but not limited to, the following types of devices: touch screen computer, mobile phone, smartphone, personal digital assistant (PDA), handset, e-reading device, tablet, game console, multimedia device, wearable computer, smart watch, telemetry appliances, and telemonitoring appliances. The wireless sensing device 102 may comprise at least one memory. In some embodiments, the wireless sensing device 102 may be a dedicated wireless sensor device with limited memory and/or processing power.

The wireless sensing device 102 and/or the moving element 104 driven by the electrical machine 103 may be adapted so as to allow rigidly fixing (preferably, detachably) the wireless sensing device 102 to a measurement position 109 on the moving element 104. The measurement position 109 may be any position on the moving element 104 enabling performing measurements using the one or more kinematic sensors 108 so as to characterize the operation of the machine. For example, the moving element may be equipped with a support, a mount or a holder for attaching the wireless sensing device 102. In the illustrated non-limiting example, the wireless sensing device 102 may be fixed to the measurement position 109 located on the belt of the conveyor belt. The wireless sensing device 102 may be equally operable when attached to the moving element 104 and when detached from it (not taking into account any possible difficulty in the user physically accessing the wireless sensing device 102 when attached to the moving element 104).

At least in some embodiments, the wireless sensing device 102 (and possibly also the drive 101) may have access (wirelessly) to a remote computing device 111 via a communications network 110. The communications network 110 comprises one or more wireless communications networks, wherein a wireless communications network may be based on any mobile system, such as GSM, GPRS, LTE, 4G, 5G and beyond, and a wireless local area network, such as Wi-Fi. Furthermore, the communications network 110 may comprise one or more fixed networks or the Internet. The remote computing device 111 may comprise at least a database server maintaining information on the drive 101 and previous measurements. The database server refers herein to a combination of a data storage (database) and a data management system. The data storage may be any kind of conventional or future data repository, including distributed and/or centralised storing of data, a cloud-based storage in a cloud environment, managed by any suitable data management system. The implementation of the data storage, the manner how data is stored, retrieved and updated are irrelevant to the invention, and therefore not described in detail here. Further, it should be appreciated that the location of the remote computing device 111 is irrelevant to the invention. The remote computing device 111 may be cloud-based.

In other embodiments, the wireless sensing device 102 may not be configured to access to the communications network 110 and/or remote computing device 111 or the wireless sensing device 102 may be configured to access the communications network 110 and/or remote computing device 111 but they may not be available at the measurement site. In some embodiments, the wireless sensing device 102 may be connected via a second wireless communication link 113 to a wireless computing device 112 which may be connected via a third communication link 114 to the drive 101. The wireless computing device 112 may be a local computing device, that is, a computing device located in the same premises (e.g., in the same factory) as the wireless sensing device 102. The wireless computing device 112 may also be configured to communicate with the remote computing device 111 via the communications network 110. In at least some of such embodiments, the wireless sensing device 112 may not be connected directly to the drive 101 and/or to the communications network 110 (or even capable of providing such connections) so the wireless sensing device 102 may only be able to communicate with the drive 101 and/or the remote computing device 111 via the wireless computing device 112. The wireless computing device 112 may be configured to control the drive 101 over the wireless communication link 114 (instead of the wireless sensing device 102) and/or the wireless sensing device. The wireless computing device 112 may perform some or all of the analysis of the measurement results provided by the wireless sensing device 102, instead of the wireless sensing device 102. The wireless computing device 112 may be, for example, a desktop or laptop computer, a mobile phone (e.g., a smart phone), a tablet computer, a server or an industrial computer. In some embodiments, the wireless computing device 112 may specifically be an Internet of Things (IoT) edge gateway. In other embodiments, the wireless computing device 112 may be a control panel of the drive 101. In such embodiments, the communication link 114 may be a wired serial bus or Ethernet link.

In some embodiments, a plurality of wireless sensing devices may be connected via wireless communication links to the wireless computing device 112. The different wireless sensing devices may be fixed to different measurement positions on the same moving element and/or different moving elements of the mechanical system 104.

Figure 2:
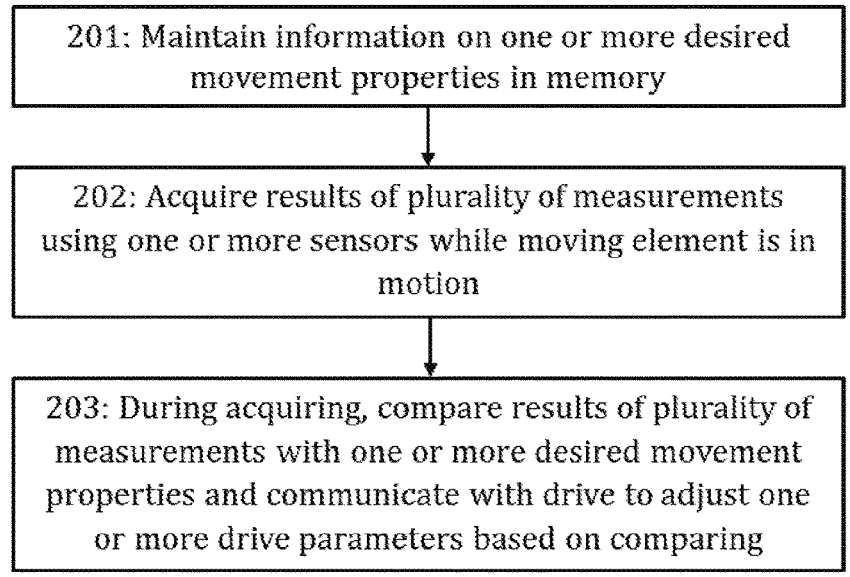
FIGS. 2 to 6 illustrate exemplary processes according to embodiments.

FIG. 2 is a flow diagram according to an embodiment of the invention, illustrating a process for tuning the operation of a mechanical system based on said measurements by a wireless sensing device (e.g., a mobile phone) attached to a moving element of the mechanical system. Specifically, the process of FIG. 2 may correspond to commissioning or calibrating an industrial system comprising a drive, an electrical machine controlled by the drive and a mechanical system powered by the electrical machine. The process may be performed by a wireless sensing device (e.g., the wireless sensing device 102 of FIG. 1) itself or using another local or remote computing device (e.g., the wireless computing device 112 of FIG. 1, the remote computing device 111 of FIG. 1 or an internal control unit of the drive) connected (wirelessly) to the wireless sensing device. In the former case, the illustrated process corresponds to a more centralized solution where the wireless sensing device performs both the measurements and the analysis while in the latter case the illustrated process corresponds to a more distributed solution where only the measurements are performed by the wireless sensing device. It is assumed in either case that the wireless sensing device comprises at least one or more kinematic sensors and is connected via at least one wireless communication link to a drive controlling the electrical machine powering the mechanical system, as illustrated in and described in relation to FIG. 1. It is further assumed that the device performing the illustrated process (i.e., the wireless sensing device, the local wireless computing device, the remote computing device, the internal control unit of the drive) comprises at least one memory or database. In the following, the term "analysis device" is used instead of "the wireless sensing device, the (local) wireless computing device, the remote computing device or the internal control unit of the drive" for brevity.

Referring to FIG. 2, the analysis device maintains, in block 201, in a memory of the analysis device, information on one or more desired movement properties for a moving element of a mechanical system powered by an electrical machine which is controlled by a drive. The wireless sensing device may be detachably fixed to the moving element of the mechanical system already at this stage of the illustrated process. The one or more desired movement properties may comprise desired values of one or more (kinematic) metrics. Each of the one or more metrics may quantify speed, acceleration, angular speed, angular acceleration, torque or displacement of the moving element to which the wireless sensing device is fixed. The one or more desired movement properties may also comprise an acoustic frequency spectrum produced by the (industrial) system when recording is carried out from the location of the moving element during the operation of the system (during a test sequence) and/or a maximum allowed temperature rise caused by the desired movement. One or more of the one or more desired movement properties may be defined through an allowed minimum value and/or an allowed maximum value (i.e., a value range). One or more of the one or more desired movement properties may be defined in a time-dependent manner, i.e., using a minimum time-dependent function defining an allowed minimum value for each time instance and/or a maximum time-dependent function defining an allowed maximum value for each time instance. Specifically, time may mean here time since the startup of the electrical machine. In some embodiments, the analysis device may also maintain in the memory information on the drive, the electrical machine the drive is controlling and/or the mechanical system.

The analysis device may, then, communicate with the drive over at least one wireless communication link to initiate operation of the electrical machine causing movement of the moving element of the mechanical system (not shown in FIG. 2). Consequently, the wireless sensing device fixed to the moving element also starts to move. This functionality is illustrated in connection with later embodiments (namely, in block 304 of FIG. 3 and messages 406, 504 of FIGS. 4 and 5). In other embodiments, the movement of the moving element may be caused by another entity or it may be initiated automatically (e.g., according to a pre-defined schedule). Communication over said at least one wireless communication link may correspond to direct communication over a single wireless communication link or communication over multiple communication links via at least one wireless computing device (e.g., the wireless sensing device 102 communicating via the wireless computing device 112 using links 113, 114 in FIG. 1). Specifically, the electrical machine may be operated by the drive according to a pre-defined test sequence. The pre-defined test sequence may comprise, for example, one or more acceleration periods when the speed is ramped up in a pre-defined manner, one or more deceleration periods when the speed is ramped down in a pre-defined manner and/or one or more periods when the speed is constant. Information on the pre-defined test sequence may be maintained in a memory of the drive or in the memory of the wireless sensing device in which case it may be provided to the drive along with the command to initiate operation.

The analysis device acquires, in block 202, results of a plurality of measurements performed by the wireless sensing device using the one or more sensors while the moving element is in motion. Specifically, the acquiring in block 202 may comprise, if said analysis device is the wireless sensing device itself, performing the plurality of measurements or if said analysis device is a wireless computing device other than the wireless sensing device, receiving results of the plurality of measurements from the wireless sensing device (via a wireless communication link or a communications network). In the latter case, the results may be transmitted after each measurement or after a certain set of measurements. Also in the latter case, the wireless computing device may transmit one or more commands to perform measurements (during a pre-defined test sequence) to the wireless sensing device to enable acquiring of the results of the plurality of measurements.

The one or more sensors using which the plurality of measurements are performed may comprise (at least) any kinematic sensors as described in relation to FIG. 1. Therefore, the wireless sensing device may perform measurements of one or more of speed, acceleration, vibration, position, angle, displacement, distance, angular speed, angular acceleration and torque. If the one or more sensors of the wireless sensing device comprises an acoustic sensor, a humidity sensor and/or a temperature sensor, the plurality of measurements may also comprise one or more sound (power) level measurement, one or more humidity measurements and/or one or more temperature measurements. The performing of the plurality of measurements may start in response to the wireless sensing device detecting movement, directly after the wireless sensing device commands the drive to start operation or after a command to initiate measurements is received (e.g., from a wireless computing device).

During the acquiring of the results of the plurality of measurements, the analysis device compares, in block 203, results of the plurality of measurements with the one or more desired movement properties and communicates, also in block 203, with the drive over said at least one wireless communication link to adjust one or more drive parameters of the drive based on the comparing to achieve the one or more desired movement properties for the moving element. Actions pertaining to blocks 202, 203 may be carried out simultaneously so that after acquiring each measurement or a pre-defined set of measurements (e.g., one or more measurements using each sensor) according to block 202, the analysis device communicates with the drive to adjust one or more drive parameters according to block 203. In other words, the one or more drive parameters of the drive are adjusted in real-time or close to real-time (multiple consecutive measurements may be performed before analyzing) based on the plurality of measurements as the plurality of measurements are performed. In other embodiments, the communicating with the drive to adjust one or more drive parameters according to block 203 is carried out only when the analysis device detects that the drive parameters need adjusting based on results of one or more measurements. The measurements may be performed, results acquired and the drive parameters adjusted until the one or more desired movement properties for the moving element are achieved. The analysis device may be configured to determine itself how the drive parameters should be adjusted in order to meet one or more desired movement properties. If minimum and/or maximum values or functions are defined in the memory, the analysis device may seek to adjust the one or more drive parameters so as not exceed the allowed limits.

If the plurality of measurements comprise one or more humidity measurements and/or one or more temperature measurements, this information may be employed also in determining how the one or more drive parameters are to be adjusted. In some embodiments, the analysis device may also determine in block 203 whether one or more requirements for the operation conditions (for example, pre-defined limits for humidity, temperature and/or temperature rise during operation) are reached.

Figure 3:
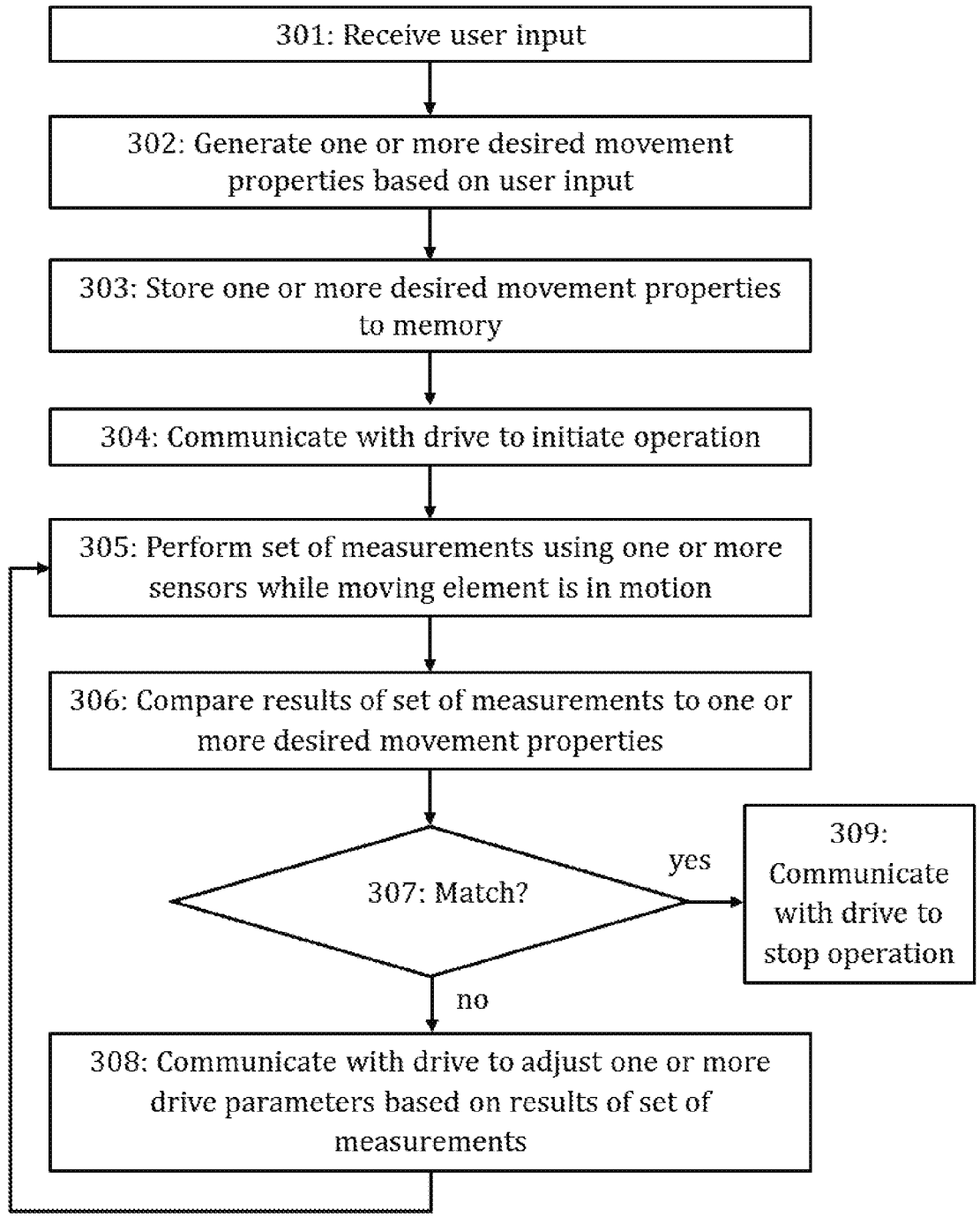

FIG. 3 shows a more detailed flow diagram according to an embodiment of the invention for a process for performing measurements by a wireless sensing device (e.g., the wireless sensing device 102 of FIG. 1) attached to a moving element of mechanical system and tuning the operation of the mechanical system based on said measurements. Any definitions and assumptions given in relation to FIG. 2 apply as such also for this embodiment. Specifically, the process of FIG. 3 may correspond to the process of FIG. 2 when carried out by the wireless sensing device (e.g., the wireless sensing device 102 of FIG. 1).

In FIG. 3, the illustrated process is initiated when the wireless sensing device receives, in block 301, user input defining or characterizing one or more desired movement properties. The user may provide said user input via a user input device (e.g., a touchscreen or a keyboard) of the wireless sensing device. The user may be guided through the process of inputting via a dedicated measurement application run on the wireless sensing device. When the user provides the user input, the wireless sensing device may not yet be fixed to the moving element of the mechanical system.

In response to receiving the user input, the wireless sensing device generates, in block 302, information on one or more desired movement properties and stores, in block 303, said information to the memory. Thereafter, the wireless sensing device may be fixed to the moving element (if it is not yet fixed to it). In some embodiments, blocks 301 to 303 may be omitted (as described in relation to FIG. 2).

The wireless sensing device communicates, in block 304, with the drive over at least one wireless communication link to initiate operation of the electrical machine causing movement of the moving element of the mechanical system. Said communication may be carried out, for example, in response to a pre-determined user input (i.e., once the user selects via a user interface "start measurements" option in a dedicated measurement application).

The wireless sensing device performs, in block 305, a set of measurements using the one or more sensors of the wireless sensing device. As described above, the one or more sensors may comprise one or more kinematic sensors and possibly one or more other sensors (e.g., an acoustic sensor). The performing of the set of measurements may correspond, for example, to performing a single measurement with each of the one or more sensors. In some embodiments, the performing of the set of measurements may correspond to performing two or more (consecutive) measurements with at least one of the one or more sensors. The performing of the set of measurements in block 305 may be initiated or triggered, for example, upon receiving an acknowledgment from the drive (see FIG. 4), directly in response transmitting a command to initiate operation in block 304 or in response to detecting movement by the wireless sensing device.

The wireless sensing device compares, in block 306, results of the set of measurements to the one or more desired movement properties for the moving element. For example, if (time-dependent or time-independent) minimum and maximum allowed values are defined for a particular quantity or metric (e.g., speed or acceleration), the wireless sensing device may determine whether the movement of the moving element is within said minimum and maximum allowed values.

In response to the results of the set of measurements failing to correspond to the one or more desired movement properties in block 307, the wireless sensing device communicates, in block 308, with the drive over said at least one wireless communication link to adjust one or more drive parameters of the drive based on results of the set of measurements to better match the one or more desired movement properties of the moving element. The correspondence in block 307 may be considered a failure if at least one of the measured quantities fails to correspond to the corresponding desired movement property (e.g., a predefined allowed range of values). In some embodiments, the adjusting may be triggered also if a measured value is within the minimum and maximum allowed values but sufficiently close to one of them.

After the one or more drive parameters have been adjusted, the wireless sensing device performs, in block 305, the same set of measurements and compares, in block 306, new results of the set of measurements to the one or more desired movement properties. In response to the new results of the set of measurements still failing to correspond to the one or more desired movement properties in block 307, another adjustment is performed in block 308. The process of block 305 to 308 is repeated until the results of the set of measurements correspond, in block 307, to the one or more desired movement properties for the moving element.

In response to the results of the set of measurements corresponding, in block 307, to the one or more desired movement properties for the moving element, the wireless sensing device communicates, in block 309, with the drive over said at least one wireless communication link to stop the operation of the electrical machine causing the movement of the moving element of the mechanical system to stop. Thereafter, the user may detach the remote sensing device from the moving element and subsequently the normal operation of the industrial system may commence.

In some embodiments, the set of measurements may be performed in block 305 a pre-defined number of times irrespective of the matching in 307. In such embodiments, if the results of the set of measurements correspond to the one or more desired movement properties in block 307, the process may simply lead back to block 305.

To give a simple example, the set of measurements carried out in block 305 may comprise one or more speed measurements and one or more acceleration measurements carried out using a speed sensor and an accelerometer of the wireless sensing device (e.g., a mobile phone), respectively. Alternatively, also the acceleration may be measured using the speed sensor (instead of a separate accelerometer) by performing multiple consecutive measurements of speed and calculating the acceleration based on said measurements. The wireless sensing device may be attached to a conveyor belt of a belt conveyor system and thus the measured speed and acceleration correspond to speed and acceleration of the conveyor belt. In one exemplary scenario, the measured acceleration may be initially, in block 306, between allowed minimum and maximum values for acceleration (defined in the one or more desired movement properties), but the measured speed (corresponding, e.g., to a speed of a conveyor belt) is below the minimum allowed value for speed. Consequently, the wireless sensing device communicates, in block 308, with the drive commanding it to adjust drive parameters of the drive so as to increase the speed of the conveyor belt without exceeding the allowed maximum acceleration for the conveyor belt.

Figure 4:
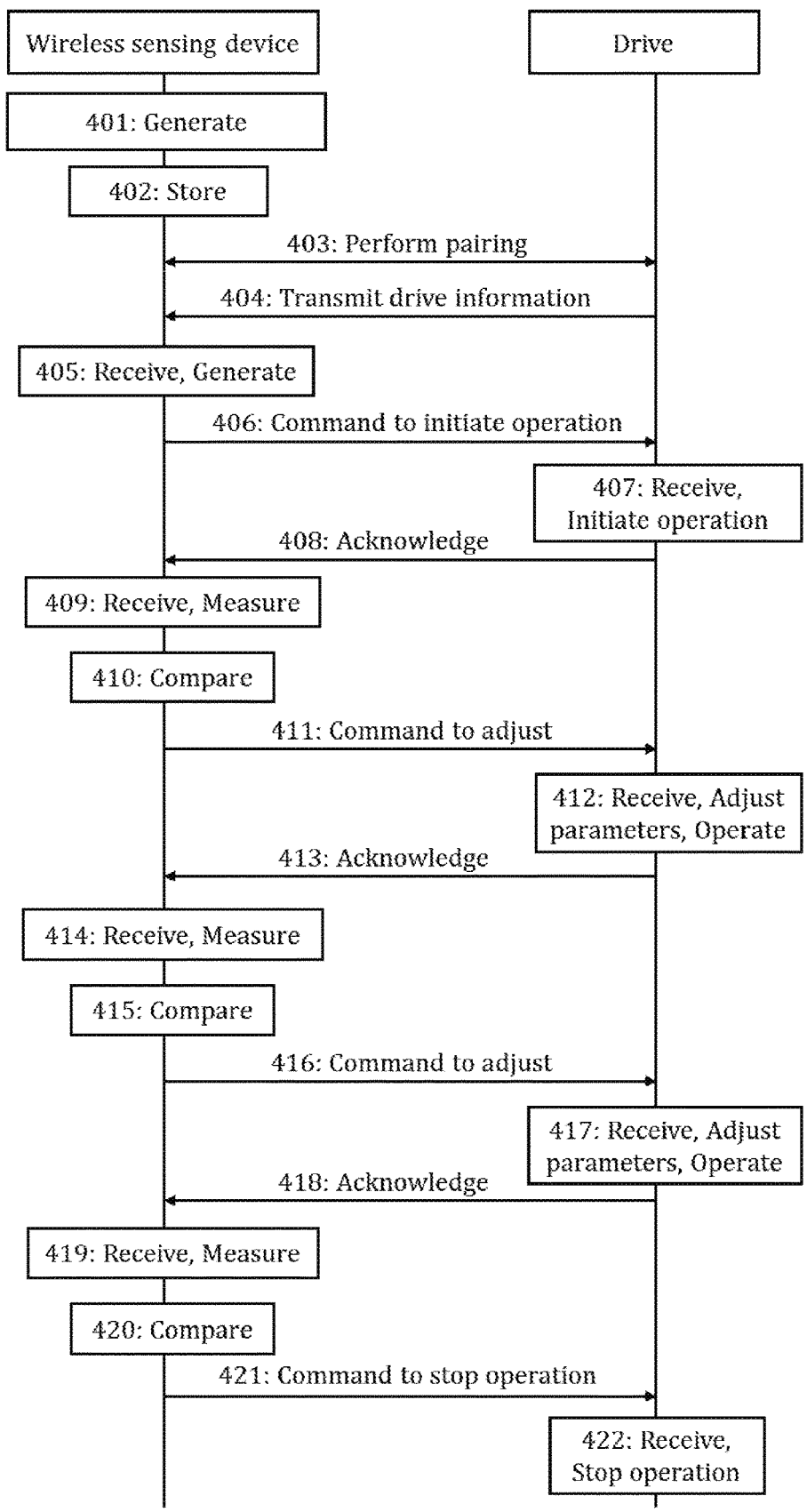

FIG. 4 shows a signalling diagram according to an embodiment. The illustrated process corresponds for the most part to the embodiments illustrated in FIGS. 2 and 3. Any definitions given in relation to FIGS. 2 and/or 3 may apply as such also for this embodiment. Specifically, the process of FIG. 4 corresponds to the process of FIG. 2 when carried out by the wireless sensing device (similar to the process of FIG. 3).

Similar to blocks 302, 303 of FIG. 3, the wireless sensing device generates, in block 401, information on one or more desired movement properties (e.g., in response to receiving user input via a user input device of the wireless sensing device) and stores, in block 402, said information to the memory. Then, the wireless sensing device performs, in messages 403, pairing with the drive wirelessly. In other words, the wireless communication link is established between the wireless sensing device and the drive in messages 403. Subsequently (or as a part of the pairing process), the drive transmits, in message 404, information on the drive to the wireless sensing device. In some alternative embodiments, said information on the drive may be transmitted to the wireless sensing device by a remote computing device via a communications network (comprising, e.g., the Internet). The information on the drive may comprise, for example, information on the drive parameters of the drive and other properties of the drive. The information on the drive parameters of the drive may comprise at least information on what drive parameters are used by the drive and their tuning ranges and optionally their current values. Said information on other properties of the drive may comprise, for example, information on the industry and the process for which the drive is being used, the type of the electrical machine (e.g., motor) connected to the drive, the location of the drive, drive environment (e.g., temperature and/or humidity) and/or any other information relevant to the operation of the drive.

Upon receiving said information on the drive, the wireless sensing device generates, in block 405, a tuning plan for the drive based on said information on the drive. The tuning plan may define the initial set of drive parameters of the drive when performing measurements with the wireless sensing device and how the drive parameters are to be adjusted subsequently based on measurements of the wireless sensing device. Specifically, the tuning plan may comprise a pre-defined test sequence (as described above), initial values for drive parameters (i.e., certain safe parameter values of one or more drive parameters for a specific application, for example, providing only relatively slow ramping of speed) and rules for drive parameter changes to optimize the performance (i.e., which parameters should be changed at a given situation and how) and one or more desired movement properties. In some embodiments, the test sequence may be set or recorded manually by a user to avoid risks of, e.g., unsafe speeds.

Similar to the previous embodiments, the wireless sensing device transmits, in message 406, to the drive a command to initiate operation of the electrical machine causing movement of the moving element of the mechanical system over the wireless communication link. Upon receiving said command in block 407, the drive initiates, in block 407, its operation (i.e., starts driving the electrical machine using initial or default values for the drive parameters), as instructed. Specifically, the drive may initiate operation according to a pre-defined test sequence (as described in relation to FIG. 2). The drive further transmit, in message 408, an acknowledgment back to the wireless sensing device after the operation has been initiated. In some embodiments, transmitting of the acknowledgment 408 (and any of the other acknowledgments 413, 418) may be omitted.

In response to receiving the acknowledgment in block 409, the wireless sensing device performs, in block 409, a set of measurements using one or more sensors and compares, in block 410, results of the set of measurements to the one or more desired movement properties for the moving element, similar to as described above in relation to blocks 305, 306 of FIG. 3. In this example, it is assumed that the results of the set of measurements fail to correspond to the one or more desired movement properties and thus the wireless sensing device transmits, in message 411, a command to adjust one or more drive parameters. The adjustment of the one or more drive parameters may be determined based on the tuning plan and the results of the set of measurements. Again the drive, in response to receiving the command in block 412, adjusts, in block 412, its drive parameters accordingly. Moreover in block 412, the drive may, again, operate according to the pre-defined test sequence, that is, the pre-defined test sequence may be repeated. In other embodiments, the drive may be configured to operate continuously after the initial command is received and operation is initiated in block 407 (until otherwise instructed). Then, the drive transmits, in block 413, an acknowledgment back to the wireless sensing device.

In this example, the initial tuning of the one or more drive parameters does not result in satisfactory movement behavior for the moving element and thus another adjustment is performed. Actions pertaining to blocks 414 to 418 correspond to actions described in relation to blocks 409 to 413 above and are thus not here repeated for brevity. After the second adjustment (or specifically after a second acknowledgment is received in block 419), the wireless sensing device performs, in block 419, once more the same set of measurements and compares, in block 420, these most recent results of the set of measurements to the one or more desired movement properties for the moving element. It is assumed in this example that this time the results of the set of measurements correspond to the one or more desired movement properties and thus the wireless sensing device transmits, in message 421, a command to stop operation (similar to block 309 of FIG. 3). In response to receiving said command in block 422, the drive stops, in block 422, the operation of the industrial system. In some embodiments, an acknowledgment may be transmitted by the drive to the wireless sensing device to confirm that the operation has seized (not shown in FIG. 4).

In the embodiments discussed above in relation to FIGS. 3 and 4, it was assumed that the wireless sensing device is computationally powerful enough to carry out analysis of the measurements results itself (for example, the wireless sensing device may be a smart phone or a tablet computer). However, in some alternative embodiments as mentioned in relation to FIG. 2, the wireless sensing device may be a simpler computing device incapable of performing said analysis functions or the wireless sensing device may be capable of performing said analysis, but it would be advantageous if the performing of the analysis could be delegated to another computing device for other reasons (for example, to reserve battery or if the industrial system is complex having multiple motors and/or drives, e.g., a paper machine, and which needs simultaneous measurements from different locations using multiple wireless sensing devices). In such embodiments, the analysis of the measurement results may be carried out by another wireless computing device connected wirelessly to the wireless sensing device. Specifically, said wireless computing device may be the remote computing device (e.g., the remote computing device 111 of FIG. 1) connected to the wireless sensing device and the drive via a communications network (e.g., the communications network 110 of FIG. 1), a local wireless computing device (e.g., the wireless computing device 112 of FIG. 1) connected to the wireless sensing device via a second wireless communication link (e.g., the wireless communication link 113 of FIG. 1) and to the drive via a third wireless communication link (e.g., the wireless communication link 114 of FIG. 1) or an (internal) control unit of the drive connected to the wireless sensing device via a first wireless communication link (e.g., the wireless communication link 106 of FIG. 1).

Figure 5:
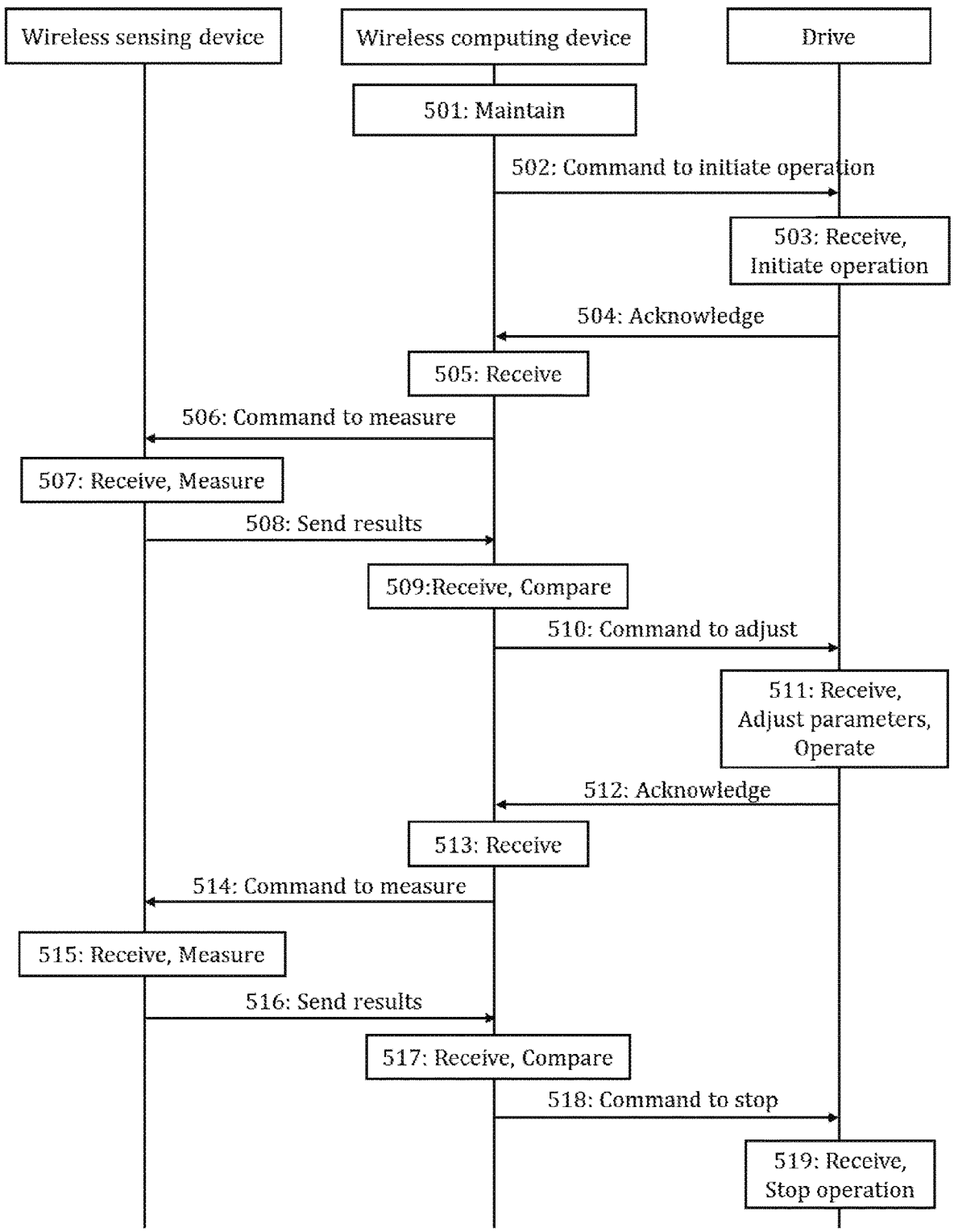

FIG. 5 shows a signalling diagram according to one such embodiment as described above. The illustrated process corresponds for the most part to the embodiments illustrated in FIGS. 2 to 4 with the main differences relating to which entity perform each action. Specifically, FIG. 5 may correspond to FIG. 2 when performed by a computing device other than the wireless sensing device performing the measurements. Any definitions given in relation to FIGS. 2, 3 and/or 4 (unless otherwise stated) may apply as such also for this embodiment. The processes carried out in FIG. 5 may be the same as in FIG. 4, but at least some of them are performed by different entities.

Referring to FIG. 5, it is assumed initially in block 501 that the wireless computing device (i.e., a remote computing device, a local wireless computing device or a control unit of the drive) maintains, in a memory of the wireless computing device, at least information on one or more desired movement properties for a moving element of a mechanical system powered by an electrical machine which is controlled by a drive and possibly also a tuning plan. The one or more desired movement properties and/or the tuning plan may have been generated by the wireless computing device based on user input of a user of the wireless computing device. Further, it may be assumed that any pairing procedures needed for enabling communication between the wireless sensing device, the wireless computing device and the drive have been already carried out. In this embodiment, no separate pairing procedure may be performed before each commissioning or calibration of the industrial system as the wireless computing device and the wireless sensing device may be devices specifically dedicated for the purpose of analyzing the operation of said industrial system (in contrast to a smart phone used in the previous embodiments which may be a personal smart phone of a user of a plurality of potential users).

The wireless computing device communicates, in block 502, with the drive to initiate operation of the electrical machine causing the movement of the moving element (preferably, according to a pre-defined test sequence). Depending on the type of the wireless computing device, this command (and any further messaging) between the wireless computing device and the drive may be delivered over a wireless communication link (in the case of a local wireless computing device), a communications network (in the case of a remote computing device) or via direct (wired) connection (in the case of an internal control unit of the drive itself). In response to receiving the command from the wireless computing device in block 503, the drive initiates, in block 503, operation of the drive (e.g., using a pre-defined test sequence which may be included in message 502 and/or maintained in a memory of the drive). The drive further transmit, in message 504, an acknowledgment back to the wireless computing device after the operation has been initiated. In response to receiving the acknowledgment in block 505, the wireless computing device transmits, in message 506, a command to start performing measurements to the wireless sensing device. The command to start performing measurements may comprise information on which measurements are to be performed by the wireless sensing device. In some embodiments, transmitting of the acknowledgment 504 and/or the command to measure 506 may be omitted.

In response to receiving the command to start performing measurements in block 507, the wireless sensing device performs, in block 507, a set of measurements using one or more sensors while the moving element is in motion. Instead of analyzing the results of the measurements itself, the wireless sensing device transmits, in block 508, results of the set of measurements to the wireless computing device for analysis. In response to receiving the results in block 509, the wireless computing device compares, in block 509, results of the set of measurements to the one or more desired movement properties for the moving element maintained in the memory, similar to as described above in relation to block 306 of FIG. 3 or block 410 of FIG. 4. In this example (similar to the embodiment of FIG. 4), it is assumed that the results of the set of measurements fail to correspond to the one or more desired movement properties and thus the wireless computing device transmits, in message 510, a command to adjust one or more drive parameters. The adjustment of the one or more drive parameters may be determined based on the tuning plan and the results of the set of measurements.

In response to receiving the command in block 511, the drive adjusts, in block 511, its drive parameters accordingly. Moreover in block 511, the drive may, again, initiate operation according to the pre-defined test sequence, that is, the pre-defined test sequence may be repeated. Instructions for repeating the operation according to the pre-defined test sequence may be included in the command in block 511 or the repeating may be performed automatically in response to the adjustment of the drive parameters. In other embodiments, the drive may be configured to operate continuously after the initial command is received and operation is initiated in block 502 (until otherwise instructed). In other words, the predefined test sequence may go on indefinitely or for a very long time (compared to the time it takes to perform the set of measurements). Then, the drive transmits, in block 413, an acknowledgment back to the wireless sensing device.

In this example, the initial tuning of the one or more drive parameters does not result in satisfactory movement behavior for the moving element and thus another adjustment is performed. Actions pertaining to blocks 512 to 517 correspond to actions described in relation to blocks 504 to 509 above and are thus not repeated here for brevity. It is assumed in this example (similar to the embodiment of FIG. 4) that the results of the set of measurements correspond to the one or more desired movement properties in block 517 and thus the wireless computing device transmits, in message 518, a command to stop operation (similar to block 309 of FIG. 3 or block 421 of FIG. 4). In response to receiving said command in block 519, the drive stops, in block 519, its operation (and thus the operation of the industrial system which it is driving). In some embodiments, an acknowledgment may be transmitted by the drive to the wireless computing device to confirm that the operation has seized (not shown in FIG. 5). After the industrial system has been commissioned (or calibrated) according to any of the embodiments discussed above, condition monitoring may be performed by making further measurements using wireless sensing device at multiple time instances during the lifecycle of the system to determine whether further tuning of the drive parameters (i.e., tuning of the performance of the mechanical system, e.g., speed and/or acceleration of the conveyor belt) is required. Further tuning of the drive parameters may be required, for example, due to wear and tear of components in the industrial system (e.g., in the mechanical system powered by the electrical machine) affecting the behavior of the industrial system.

Figure 6:
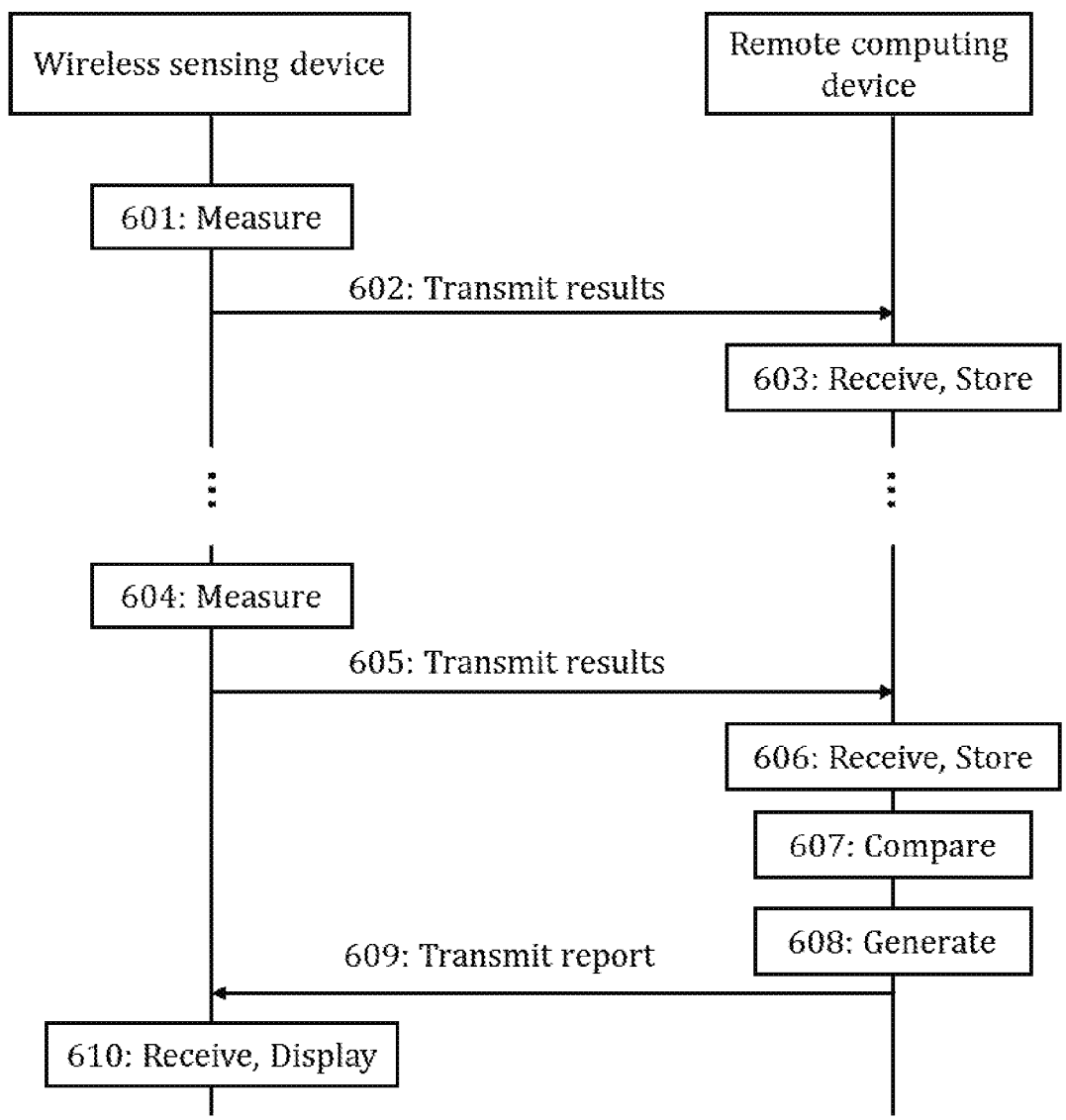

FIG. 6 illustrates with a signaling diagram processes for performing the condition monitoring of the industrial system (e.g., the industrial system illustrated in FIG. 1), namely, a process for performing initial set of measurements acting as a baseline for subsequent measurements according to embodiments and a process for performing said further measurements according to embodiments. FIG. 6 illustrates a simplified embodiment where only the actions relating to the communication between the wireless sensing device and the remote computing device for performing the condition monitoring are shown. In other words, actions relating to communication between the wireless sensing device and the drive have been omitted for brevity though said actions relating, e.g., to initiating the operation of the drive may be carried out as discussed in relation to above embodiments. Before each measurement by the wireless sensing device, pairing may be performed as discussed in relation to message 403 of FIG. 4, the wireless sensing device may command the drive initiate operation as discussed in relation to block 304 of FIG. 3 and/or message 406 of FIG. 4 and/or the drive may initiate operation as discussed in relation to blocks 406 of FIG. 4. After each measurement by the wireless sensing device, the wireless sensing device may command the drive to stop the operation according to block 308 of FIG. 3 and/or block 420 of FIG. 4.

In FIG. 6, it is assumed that the industrial system has been recently calibrated or commissioned according to any of the embodiments discussed above and thus its operation is optimal. The wireless sensing device performs, in block 601, a set of condition monitoring measurements using the one or more sensors to establish initial results for the set of condition monitoring measurements acting as baseline for condition monitoring. The set of condition monitoring measurements are performed when the moving element of the mechanical system is in motion and the industrial system is operating according to its normal configuration (i.e., using drive parameters determined during commissioning). The performing of the set of condition monitoring measurements may correspond to performing one or more measurements (i.e., a single measurement or a set of consecutive measurements) with each of the one or more sensors. The set of condition monitoring measurements may the set of measurements discussed in relation to FIG. 3.

The wireless sensing device transmits, in message 602, information on initial results of the set of condition monitoring measurements to a remote computing device via a communications network. Subsequently, the remote computing device stores, in block 603, the initial results for the set of condition monitoring measurements as baseline results for the set of condition monitoring measurements to a database.

The initial set of measurements (block 601) should be taken as soon as possible after the industrial system has been installed and setup to operate. In some embodiments, the baseline results for the set of condition monitoring measurements may be acquired directly after the commissioning according to embodiments (in some case maybe even without halting the operation of the industrial system and/or detaching the wireless sensing device). After acquiring the initial results for the set of condition monitoring measurements according to blocks 601 to 603, a significant amount of time (several weeks or months or even over a year) may pass before further condition monitoring actions are undertaken. Eventually, the wireless sensing device performs, in block 604, again the set of condition monitoring measurements using the one or more sensor, that is, the same set of condition monitoring measurements is repeated. Same as before, the wireless sensing device transmits, in message 605, the most recent result for the set of condition monitoring measurements to the remote computing device via the communications network for performing condition analysis and upon receiving said most recent results for the set of condition monitoring measurements, the remote computing device store them also to the database. Subsequently, the remote computing device compares, in block 607, the most recent results (i.e., subsequent results) to the baseline results. Based on the comparing, the remote computing device generates, in block 608, a condition monitoring report. The condition monitoring report indicates at least differences between the most recent results and the baseline results and the extent of said differences.

In some embodiments, the remote computing device may determine, in block 607, whether a pre-defined threshold for a metric quantifying the difference between the most recent results and the baseline results is exceeded and if this is the case, a warning may be included in the generated condition monitoring report indicating to the user that re-tuning of the used drive parameters is recommended. Alternatively, a separate pre-defined threshold may be defined for each measured quantity and the remote computing device may determine, in block 607, whether at least one of said one or more pre-defined thresholds is exceeded. If any of the one or more pre-defined thresholds is exceeded, a warning is included in the condition monitoring report.

The remote computing device transmits, in block 609, the condition monitoring report to the wireless sensing device via the communications network. In response to receiving the condition monitoring report, the wireless sensing device displays, in block 610, information on the condition monitoring report on a display of the wireless sensing device.

Based on the displayed information, the user of the wireless sensing device is able to determine whether further tuning of the industrial system (i.e., of the drive parameters of the drive) is required due to deterioration in the condition of the component(s) of the industrial system or due to some other reason such as a change in the environment where the system is operated (e.g., increased or decreased temperature).

In some alternative embodiments, the role carried out by the remote computing device in the condition monitoring discussed in relation to FIG. 6 may be carried out, instead, by a local wireless computing device (e.g., the wireless computing device 112 of FIG. 1). In other words, "Remote computing device" in FIG. 6 may be replaced by a local wireless computing device in some embodiment. In such embodiments, the report may not be transmitted to the wireless sensing device (i.e., blocks 609, 610 may be omitted). Instead, information on the generated report may be displayed on a screen of the local wireless computing device. In other embodiments, some of the processes performed by the remote computing device in FIG. 6 may be performed by a local wireless computing device and others by the remote computing device (which is in communication with the local wireless computing device).

While in FIG. 6 the initial set of measurements (i.e., block 601) and the consequent set of measurement (i.e., block 604) are performed by the same wireless sensing device, in other embodiments said two phases may be carried out using different wireless sensing devices (and by different users).

Figure 7:
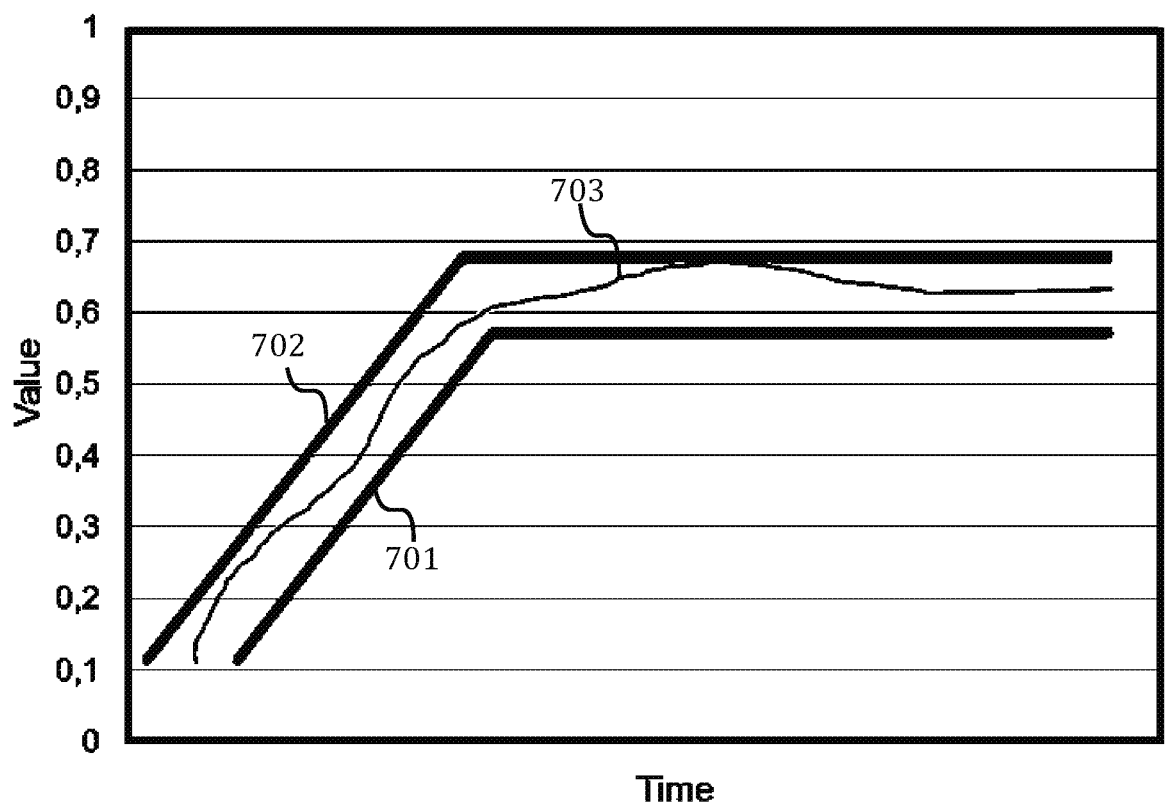
FIG. 7 illustrates exemplary output provided by processes according to embodiments.

FIG. 7 illustrates one example of a definition for a particular desired movement property defined in an analysis device (i.e., a wireless sensing device, a wireless computing device, a remote computing device or an internal control unit of the drive as described above) and a set of successive measurements (of the same type) performed by the wireless sensing device corresponding to said desired movement property. The horizontal axis in FIG. 7 represents time and the vertical axis may represent, for example, speed of a conveyor belt directly in meters per second or normalized to a particular speed value. Specifically, in FIG. 7 there is defined a channel or a window within which the measurements (that is, the measured values) should fall. Said window is defined by a minimum time-dependent function 701 and a maximum time-dependent function 702. FIG. 7 corresponds specifically to a case where the conveyor belt (or other mechanical system) is first activated leading to an initial time period during which the conveyor belt accelerates to a desired operational speed. When the desired operational speed has been reached, said speed should be maintained. During both of these stages, some fluctuations in speed is allowed (i.e., fluctuations within the window are allowed). The window may have been generated as discussed in relation to block 302 of FIG. 3 based on user input. In other embodiments, in addition to an acceleration stage a corresponding deceleration stage may be defined in a similar manner. Drive parameters may be defined separately for each stage (acceleration, no acceleration and deceleration).

The curve 703 represents speed measured by a wireless sensing device fixed to the conveyor belt. The analysis device is configured to tune the drive parameters of the drive so as keep the measurement values within the window. After each measurement or at least if a measured value is detected to be close to an edge of the window, the drive parameters of the drive controlling the electrical machine powering the conveyor belt are adjusted, as described in relation to above embodiments.

In the following, the operation of the invention according to embodiments is described using an exemplary user story.

Sami is a commissioning engineer. Today he needs to travel to Helsinki a chocolate factory to commission a production line which includes multiple motors and drives. One of the biggest challenges for this kind of tuning is that it is very difficult to tune the conveyer belt speed so that it can be run according to the very strict speed required profiles.

Sami will perform the commissioning using an intelligent tuning application running on his mobile phone (a wireless sensing device as discussed above). First, Sami inputs all the belt performance parameters into the application, such as the belt ramp up speed, overshoot limit, vibrations and so on. Then, Sami pairs his mobile phone using the application with the target drive(s) which drive one or more motors that run the conveyer belt of the chocolate production line. The application automatically takes all the input parameters, considering the target drives functionalities, and forms a tuning plan. Then, he places the mobile phone on an attachment kit onto the belt so that it is securely fixed onto the belt so as to ensure the accuracy of the measurements to be carried out by the mobile phone. Finally, he starts "intelligent auto-tuning function" in the application running on his mobile phone.

The application starts to launch a sequence of attempts to load different drive parameters into the drive while measuring with, e.g., gyroes and acceleration sensors inside the mobile phone the belt performance. It seems that after a few attempts, the application "intelligently learned" the best drive parameter settings for the drive(s) for getting a satisfactory performance for the setup.

The blocks, related functions, and information exchanges described above by means of FIGS. 2 to 7 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 8:
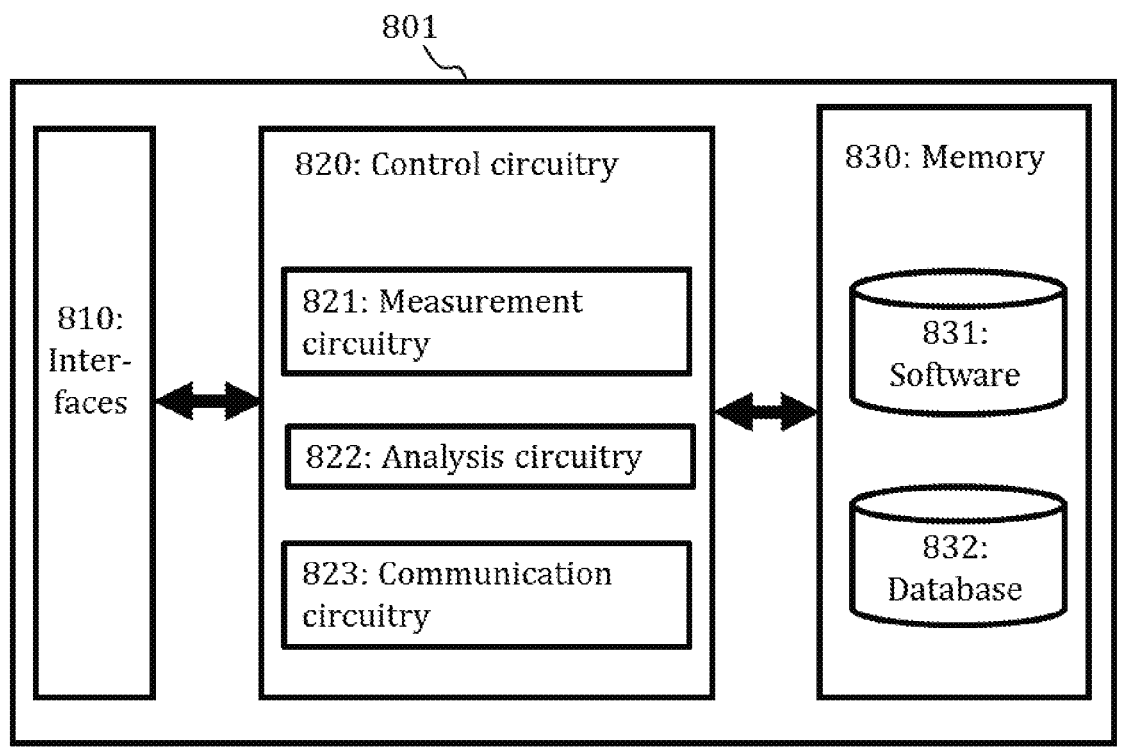
FIGS. 8 to 10 illustrate apparatuses according to embodiments.

FIG. 8 provides a wireless sensing device 801 according to some embodiments.

Specifically, FIG. 8 may illustrate a wireless sensing device configured to carry out at least the functions described above in connection with performing measurements using one or more sensors and communicating with a drive over a wireless communication link (and possibly with a remote computing device via a communications network). The wireless sensing device 801 may be a wireless sensing device 102 of FIG. 1. The wireless sensing device 801 may comprise one or more control circuitry 820, such as at least one processor, and at least one memory 830, including one or more algorithms 831, such as a computer program code (software) wherein the at least one memory and the computer program code (software) are configured, with the at least one processor, to cause the wireless sensing device to carry out any one of the exemplified functionalities of the wireless sensing device described above, respectively. Said at least one memory 830 may also comprise at least one database 832.

Referring to FIG. 8, the one or more control circuitry 820 of the wireless sensing device 801 comprise at least measurement circuitry 821 which is configured to perform measuring using one or more sensors of the wireless sensing device. To this end, the measurement circuitry 821 is configured to carry out functionalities described above by means of any of block 202 of FIG. 2, block 305 of FIG. 3, blocks 409, 414, 419 of FIG. 4 (at least the measuring), blocks 507, 515 (the measuring steps) and/or blocks 601, 604 of FIG. 6 using one or more individual circuitries. The one or more control circuitry 820 of the wireless sensing device 801 further comprises analysis circuitry 822 for analyzing the measurement results. The analysis circuitry 822 is configured to carry out functionalities described above by means of any of block 203 of FIG. 2 (at the least the comparing), block 305, 306 of FIG. 3, blocks 410, 415, 420 of FIG. 4 and/or block 610 of FIG. 6 (at least the displaying) using one or more individual circuitries. Finally, the one or more control circuitry 820 comprises communication circuitry 823 for communicating with the drive over a wireless communication link and possible also with the remote computing device over the communications network. The communication circuitry 823 is configured to carry out functionalities described above by means of any of block 203 of FIG. 2, block 307, 308 of FIG. 3, blocks 405, 409, 414, 419 (the receiving steps) and messages 403, 406, 411, 416, 421 of FIG. 4, blocks 507, 515 (the receiving steps) and messages 508, 516 of FIG. 5, block 610 (the receiving) and messages 602, 605 of FIG. 6 using one or more individual circuitries.

As discussed above, in some embodiments the wireless sensing device may not carry out the analysis of the measurement results itself, but said analysis may be carried out by a different computing device. In such embodiments, the control circuitry 820 of the wireless sensing device 801 may not comprise the analysis circuitry 822. Referring to FIG. 8, the memory 830 may be implemented using any suitable data storage technology, such as semiconductor based memory devices, flash memory, magnetic memory devices and systems, optical memory devices and systems, fixed memory and removable memory.

Referring to FIG. 8, the wireless sensing device 801 may further comprise different interfaces 810 such as one or more communication interfaces (TX/RX) comprising hardware and/or software for realizing communication connectivity according to one or more communication protocols. Specifically, the one or more communication interfaces 810 may comprise, for example, interfaces providing a connection to a drive and possibly to a remote computing device via a communications network. The one or more communication interface 810 may provide the wireless sensing device with communication capabilities to communicate in a cellular communication system and enable communication between user devices (terminal devices) and different network nodes or elements and/or a communication interface to enable communication between different network nodes or elements, for example. The one or more communication interfaces 810 may comprise standard wellknown components such as an amplifier, filter, frequency-converter, (de)modulator, and encoder/decoder circuitries, controlled by the corresponding controlling units, and one or more antennas. The interfaces 810 may comprise one or more sensors. Said one or more sensor may comprise at least one or more kinematic sensors.

Figure 9:
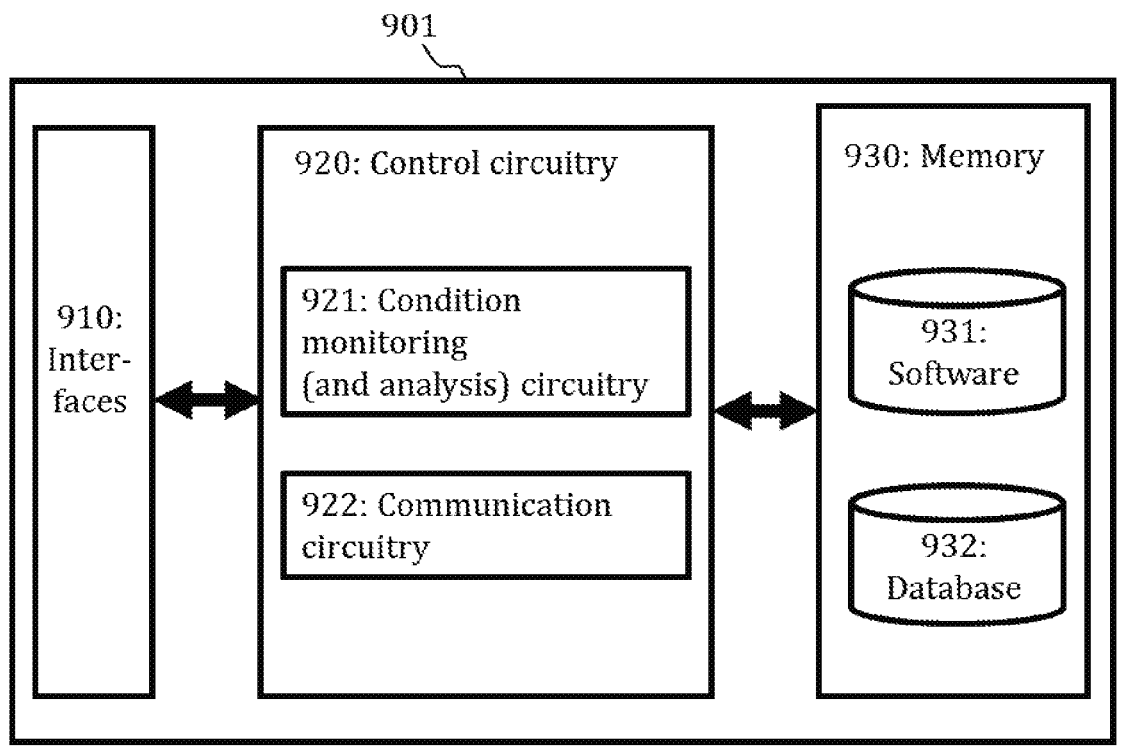

FIG. 9 provides a remote computing device 901 according to some embodiments. Specifically, FIG. 9 may illustrate a remote computing device configured to carry out at least the functions described above in connection with performing condition monitoring in communication with a wireless sensing device. The remote computing device 901 may be the remote computing device 111 of FIG. 1. The remote computing device 901 may comprise one or more control circuitry 920, such as at least one processor, and at least one memory 930, including one or more algorithms 931, such as a computer program code (software) wherein the at least one memory and the computer program code (software) are configured, with the at least one processor, to cause the remote computing device to carry out any one of the exemplified functionalities of the remote computing device described above, respectively. Said at least one memory 930 may also comprise at least one database 932.

Referring to FIG. 9, the one or more control circuitry 920 of the remote computing device 901 comprise at least condition monitoring circuitry 921 which is configured to perform condition monitoring analysis. To this end, the measurement circuitry 921 is configured to carry out functionalities described above by means of any of blocks 603 (at least the storing), 606 (at least the storing), 607, 608 of FIG. 6 using one or more individual circuitries. The one or more control circuitry 920 of the remote computing device 901 further comprises communication circuitry 922 for communicating with the wireless sensing device over the communications network. The communication circuitry 922 is configured to carry out functionalities described above by means of blocks 603 (at least the receiving), 606 (at least the receiving) and message 609 of FIG. 6 using one or more individual circuitries.

As discussed above, in some embodiments the wireless sensing device may not carry out the analysis of the measurement results itself, but said analysis may be carried out by another computing device. In some of such embodiments, said another computing device may be the remote computing device 901. In these embodiments, the control circuitry 920 may further comprise analysis circuitry 921 configured to carry out functionalities described above by means of any of blocks 509, 517 (the comparing steps) of FIG. 5 using one or more individual circuitries. Moreover, the communication circuitry 922 may be configured to enable communicating also directly with one or more drives over a communications network. The communication circuitry 1022 may, thus, be configured to carry out functionalities described above by means of any of blocks 509, 513, 517 (the receiving steps) and messages 502, 506, 510, 514, 518 of FIG. 5 using one or more individual circuitries.

Referring to FIG. 9, the memory 930 may be implemented using any suitable data storage technology, such as semiconductor based memory devices, flash memory, magnetic memory devices and systems, optical memory devices and systems, fixed memory and removable memory.

Referring to FIG. 9, the remote computing device 901 may further comprise different interfaces 910 such as one or more communication interfaces (TX/RX) comprising hardware and/or software for realizing communication connectivity according to one or more communication protocols. Specifically, the one or more communication interfaces 910 may comprise, for example, interfaces providing a connection to a wireless sensing device via a communications network. The one or more communication interface 910 may provide the remote computing device with communication capabilities to communicate in a cellular communication system and enable communication between user devices (terminal devices) and different network nodes or elements and/or a communication interface to enable communication between different network nodes or elements, for example. The one or more communication interfaces 910 may comprise standard well-known components such as an amplifier, filter, frequency-converter, (de)modulator, and encoder/decoder circuitries, controlled by the corresponding controlling units, and one or more antennas.

Figure 10:
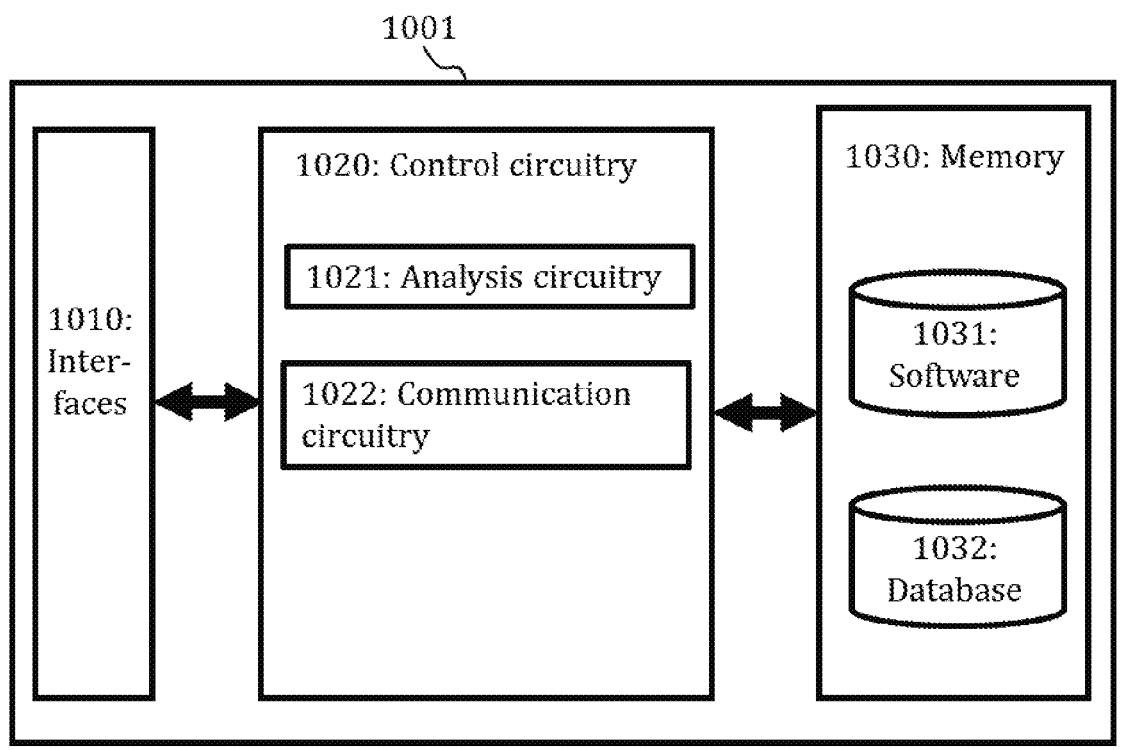

FIG. 10 provides a wireless computing device 1001 according to some embodiments. Specifically, FIG. 10 may illustrate a wireless computing device configured to carry out at least the functions described above in connection with analyzing measurement results produced by a wireless sensing device, controlling the wireless sensing device, communicating with a drive over a wireless communication link and/or communicating with a remote computing device. The wireless computing device 1001 may be a wireless computing device 112 of FIG. 1 or an internal control unit of the drive 101 of FIG. 1. The wireless computing device 1001 may comprise one or more control circuitry 1020, such as at least one processor, and at least one memory 1030, including one or more algorithms 1031, such as a computer program code (software) wherein the at least one memory and the computer program code (software) are configured, with the at least one processor, to cause the wireless computing device to carry out any one of the exemplified functionalities of the wireless computing device described above, respectively. Said at least one memory 1030 may also comprise at least one database 1032.

Referring to FIG. 10, the one or more control circuitry 1020 of the wireless computing device 1001 comprise at least analysis circuitry 1021 for analyzing measurement results. The analysis circuitry 1021 is configured to carry out functionalities described above by means of any of blocks 509, 517 (the comparing steps) of FIG. 5 using one or more individual circuitries. The one or more control circuitry 1020 also comprises communication circuitry 1022 for communicating with one or more drives over wireless communication links, with one or more wireless sensing devices over other wireless communication links and with the remote computing device over a communications network. The communication circuitry 1022 is configured to carry out functionalities described above by means of any of blocks 509, 513, 517 (the receiving steps) and messages 502, 506, 510, 514, 518 of FIG. 5 using one or more individual circuitries.

Referring to FIG. 10, the memory 1030 may be implemented using any suitable data storage technology, such as semiconductor based memory devices, flash memory, magnetic memory devices and systems, optical memory devices and systems, fixed memory and removable memory.

Referring to FIG. 10, the wireless computing device 1001 may further comprise different interfaces 1010 such as one or more communication interfaces (TX/RX) comprising hardware and/or software for realizing communication connectivity according to one or more communication protocols. Specifically, the one or more communication interfaces 1010 may comprise, for example, interfaces providing a connection to one or more drives, one or more wireless sensing devices and a remote computing device via a communications network. The one or more communication interface 1010 may provide the wireless computing device with communication capabilities to communicate in a cellular communication system and enable communication between user devices (terminal devices) and different network nodes or elements and/or a communication interface to enable communication between different network nodes or elements, for example. The one or more communication interfaces 1010 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 2 to 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 7 or operations thereof.

Further regarding the means for performing the processes, the techniques and methods described herein may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   maintaining, in a memory of a wireless sensing device, information on one or more desired movement properties for a moving element of a mechanical system powered by an electrical machine which is controlled by a drive, wherein the wireless sensing device is a computing device comprising one or more sensors and being configured to communicate wirelessly with the drive over at least one wireless communication link, the one or more sensors comprising one or more kinematic sensors;
   performing, by the wireless sensing device being detachably fixed to the moving element of the mechanical system when the moving element is in motion, a plurality of measurements using the one or more sensors; and
   during the performing, comparing, by the wireless sensing device, results of the plurality of measurements with the one or more desired movement properties and communicating, by the wireless sensing device, with the drive over said at least one wireless communication link to adjust one or more drive parameters of the drive based on the comparing to achieve the one or more desired movement properties for the moving element.

2. The method according to claim 1, wherein the information on the one or more desired movement properties was generated based on user input.

3. The method according to claim 1, wherein each of the one or more kinematic sensors is one of a speed sensor, an acceleration sensor, a vibration sensor, a position sensor, an angular position sensor, a displacement sensor, an angular velocity sensor, an angular acceleration sensor and a torque sensor.

4. The method according to claim 1, wherein the one or more sensors comprise one or more of an acoustic sensor, a humidity sensor and a temperature sensor.

5. The method according to claim 1, wherein the wireless sensing device is a mobile phone or a tablet computer.

6. The method according to claim 1, wherein the moving element of the mechanical system is a lift, a crane, a conveyor belt, a feeder, a winch, a wind turbine, a pump or a fan.

7. The method according to claim 1, wherein the one or more desired movement properties comprise:
   desired values for one or more metrics, desired value ranges for the one or more metrics, time-dependent functions for desired values for the one or more metrics, time-dependent functions for desired value ranges for the one or more metrics, an acoustic frequency spectrum relating to desired movement and/or maximum allowed temperature rise caused by the desired movement, each of the one or more metrics quantifying speed, acceleration, angular speed, angular acceleration, torque, vibration or displacement.

8. The method according to claim 1, further comprising:
communicating, by the wireless sensing device, with the drive, before the performing, to initiate operation of the electrical machine causing the movement of the moving element according to a pre-defined test sequence.

9. The method according to claim 8, wherein the performing of the plurality of measurements and the comparing and the communicating during the performing of the plurality of measurements comprise:
  a) performing a set of measurements using the one or more sensors during the pre-defined test sequence;
  b) comparing results of the set of measurements to the one or more desired movement properties for the moving element;
  c) in response to the results of the set of measurements failing to correspond to the one or more desired movement properties, communicating with the drive over at least one wireless communication link to adjust one or more drive parameters of the drive based on results of the set of measurements to better match the one or more desired movement properties of the moving element and repeating acts a)-c).

10. The method according to claim 8, wherein the wireless sensing device communicates with the drive over a first wireless communication link or over a second wireless communication link and a third wireless communication link, wherein the second wireless communication link is between the wireless sensing device and a wireless computing device and the third wireless communication link is between the wireless computing device and the drive, the wireless computing device being configured to control operation of the drive wirelessly over the second communication link so as to cause the movement of the moving element.

11. The method according to claim 8, the method comprising, before the performing of the plurality of measurements:
  causing, by the wireless sensing device, pairing between the wireless sensing device and the drive to form a first wireless communication link;
  receiving, in the wireless sensing device, information on the drive from the drive over the first wireless communication link;
  generating, by the wireless sensing device, a tuning plan for the drive controlling the electrical machine based on the information on the one or more desired movement properties for the moving element of the mechanical system and the information on the drive; and
  performing the initiating of the operation of the electrical machine and any adjusting of the one or more drive parameters using the drive according to the tuning plan over the first wireless communication link.

12. The method according to claim 8, the method comprising, after the one or more desired movement properties for the moving element are achieved:
  performing, by the wireless sensing device, a set of condition monitoring measurements performed by the wireless sensing device using the one or more sensors when the moving element is in motion to establish initial results for the set of condition monitoring measurements acting as baseline for condition monitoring;
  transmitting, by the wireless sensing device, information on the initial results of the set of condition monitoring measurements to one of a remote computing device via a communications network and a local wireless computing device via a second wireless communication link;
  performing, by the wireless sensing device, again the set of condition monitoring measurements using the one or more sensor when the moving element is in motion;
  transmitting, by the wireless sensing device, most recent results of the set of condition monitoring measurements to said one of the remote computing device via the communications network and the local wireless computing device via the second wireless communication link for performing condition analysis; and
  in response to receiving, in the wireless sensing device, a condition monitoring report generated by said one of the remote computing device and the wireless computing device based on comparing the most recent results and the initial results, displaying, by the wireless sensing device, information on the condition monitoring report on a display.

13. The method according to claim 9, wherein the act c) further comprises:
  communicating, by the wireless sensing device, with the drive over said at least one wireless communication link to repeat operation of the electrical machine according to the pre-defined test sequence.

14. A method comprising:
  maintaining, in a memory of a wireless computing device, information on one or more desired movement properties for a moving element of a mechanical system powered by an electrical machine which is controlled by a drive, wherein the wireless computing device is one of
    a remote computing device configured to communicate with a wireless sensing device and the drive via a communications network,
    a local computing device configured to communicate with the wireless sensing device via a second wireless communication link and to the drive via a third wireless communication link and
    an internal control unit of the drive configured to communicate with the wireless sensing device via a first wireless communication link;
  receiving, by the wireless computing device, results of a plurality of measurements performed by the wireless sensing device using one or more sensors of the wireless sensing device and being detachably fixed to the moving element of the mechanical system when the moving element is in motion, wherein the one or more sensors comprise one or more kinematic sensors; and
  during the receiving, comparing, by the wireless computing device, the results of the plurality of measurements with the one or more desired movement properties and communicating, by the wireless computing device, with the drive to adjust one or more drive parameters of the drive based on the comparing to achieve the one or more desired movement properties for the moving element.

15. The method according to claim 14, wherein the information on the one or more desired movement properties was generated based on user input.

16. The method according to claim 14, wherein each of the one or more kinematic sensors is one of a speed sensor, an acceleration sensor, a vibration sensor, a position sensor, an angular position sensor, a displacement sensor, an angular velocity sensor, an angular acceleration sensor and a torque sensor.

17. The method according to claim 14, wherein the one or more sensors comprise one or more of an acoustic sensor, a humidity sensor and a temperature sensor.

18. The method according to claim 14, wherein the wireless sensing device is a mobile phone or a tablet computer.

19. The method according to claim 14, wherein the moving element of the mechanical system is a lift, a crane, a conveyor belt, a feeder, a winch, a wind turbine, a pump or a fan.

20. The method according to claim 14, wherein the one or more desired movement properties comprise desired values, desired value ranges, time-dependent functions for desired values and/or time-dependent functions for desired value ranges for one or more metrics and/or an acoustic frequency spectrum relating to desired movement and/or maximum allowed temperature rise caused by the desired movement, each of the one or more metrics quantifying speed, acceleration, angular speed, angular acceleration, torque, vibration or displacement.

21. The method of claim 14, comprising:
transmitting, by the wireless computing device, one or more commands to perform measurements during a pre-defined test sequence to the wireless sensing device.

22. The method of claim 21, wherein the transmitting of the one or more commands to the wireless sensing device, the receiving of the results and the comparing and the communicating during the receiving of the results comprise
a) transmitting a command to perform a set of measurements during the pre- defined test sequence to the wireless sensing device;
b) in response to receiving results of the set of measurements from the wireless sensing device, comparing, by the wireless computing device, results of the set of measurements to the one or more desired movement properties for the moving element; and
c) in response to the results of measurements failing to correspond to the one or more desired movement properties, communicating with the drive to adjust one or more drive parameters of the drive based on results of the set of measurements to better match the one or more desired movement properties of the moving element and repeating acts a) — c).

23. The method according to claim 22, wherein the act c) further comprises:
communicating with the drive to repeat operation of the electrical machine according to the pre-defined test sequence.

24. An apparatus comprising:
at least one processor; and
at least one memory of a wireless sensing device including computer program code,
the at least one memory and the computer program code being configured, with the at least one processor, to cause the apparatus to
maintain, in the memory of the wireless sensing device, information on one or more desired movement properties for a moving element of a mechanical system powered by an electrical machine which is controlled by a drive, wherein the wireless sensing device comprising one or more sensors and being configured to communicate wirelessly with the drive over at least one wireless communication link, the one or more sensors comprising one or more kinematic sensors;
perform, by the wireless sensing device being detachably fixed to the moving element of the mechanical system when the moving element is in motion, a plurality of measurements using the one or more sensors; and
during the performing, comparing, by the wireless sensing device, results of the plurality of measurements with the one or more desired movement properties and communicating, by the wireless sensing device, with the drive over said at least one wireless communication link to adjust one or more drive parameters of the drive based on the comparing to achieve the one or more desired movement properties for the moving element.

25. An apparatus comprising:
at least one processor; and
at least one memory of a wireless computing device including computer program code,
the at least one memory and the computer program code being configured, with the at least one processor, to cause the apparatus to
maintain, in the memory of the wireless computing device, information on one or more desired movement properties for a moving element of a mechanical system powered by an electrical machine which is controlled by a drive, wherein the wireless computing device is one of
a remote computing device configured to communicate with a wireless sensing device and the drive via a communications network,
a local computing device configured to communicate with the wireless sensing device via a second wireless communication link and to the drive via a third wireless communication link and
an internal control unit of the drive configured to communicate with the wireless sensing device via a first wireless communication link;
receive, by the wireless computing device, results of a plurality of measurements performed by the wireless sensing device using one or more sensors of the wireless sensing device and being detachably fixed to the moving element of the mechanical system when the moving element is in motion, wherein the one or more sensors comprise one or more kinematic sensors; and
during the receiving, compare, by the wireless computing device, the results of the plurality of measurements with the one or more desired movement properties and communicating, by the wireless computing device, with the drive to adjust one or more drive parameters of the drive based on the comparing to achieve the one or more desired movement properties for the moving element.

26. A non-transitory computer readable media, comprising:
instructions stored thereon that, when executed by a computing device, cause the computing device to
maintain, in a memory of a wireless sensing device, information on one or more desired movement properties for a moving element of a mechanical system powered by an electrical machine which is controlled by a drive, wherein the wireless sensing device comprises the computing device including one or more sensors and being configured to communicate wirelessly with the drive over at least one wireless communication link, the one or more sensors comprising one or more kinematic sensors;

perform, by the wireless sensing device being detachably fixed to the moving element of the mechanical system when the moving element is in motion, a plurality of measurements using the one or more sensors; and during the performing, compare, by the wireless sensing device, results of the plurality of measurements with the one or more desired movement properties and communicating, by the wireless sensing device, with the drive over said at least one wireless communication link to adjust one or more drive parameters of the drive based on the comparing to achieve the one or more desired movement properties for the moving element.

27. A non-transitory computer readable media, comprising:

instructions stored thereon that, when executed by a wireless computing device, cause the wireless computing device to maintain, in a memory of the wireless computing device, information on one or more desired movement properties for a moving element of a mechanical system powered by an electrical machine which is controlled by a drive, wherein the wireless computing device is one of a remote computing device configured to communicate with a wireless sensing device and the drive via a communications network, a local computing device configured to communicate with the wireless sensing device via a second wireless communication link and to the drive via a third wireless communication link and an internal control unit of the drive configured to communicate with the wireless sensing device via a first wireless communication link;

receive, by the wireless computing device, results of a plurality of measurements performed by the wireless sensing device using one or more sensors of the wireless sensing device and being detachably fixed to the moving element of the mechanical system when the moving element is in motion, wherein the one or more sensors comprise one or more kinematic sensors; and during the receiving, compare, by the wireless computing device, the results of the plurality of measurements with the one or more desired movement properties and communicating, by the wireless computing device, with the drive to adjust one or more drive parameters of the drive based on the comparing to achieve the one or more desired movement properties for the moving element.

* * * * *